United States Patent [19]

Yamamoto et al.

[11] Patent Number: 4,521,589
[45] Date of Patent: Jun. 4, 1985

[54] LINEAR POLY(3-ALKYL-2,5-THIENYLENE) POLYMER

[75] Inventors: Takakazu Yamamoto, Yokohama; Akio Yamamoto, Tokyo; Kenichi Sanechika, Yokohama, all of Japan

[73] Assignee: Tokyo Institute of Technology, Tokyo, Japan

[21] Appl. No.: 568,276

[22] Filed: Jan. 4, 1984

Related U.S. Application Data

[63] Continuation of Ser. No. 432,374, Sep. 30, 1982, abandoned.

[30] Foreign Application Priority Data

Feb. 26, 1982 [JP] Japan .................. 57-29082

[51] Int. Cl.³ .................. C08G 75/00; C08F 28/06
[52] U.S. Cl. .................. 528/380; 252/511; 524/401; 524/422; 524/609; 526/256; 528/378; 528/379
[58] Field of Search .................. 528/380, 378, 379; 524/422, 609, 401; 252/511; 526/256

[56] References Cited

U.S. PATENT DOCUMENTS 2,552,796 5/1951 Koft .................. 528/380

FOREIGN PATENT DOCUMENTS 57-15369 1/1982 Japan .

Primary Examiner—Harold D. Anderson
Attorney, Agent, or Firm—Spencer & Frank

[57] ABSTRACT

A linear poly(3-alkyl-2,5-thienylene) polymer having the formula:

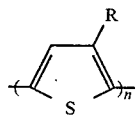

wherein R represents a lower alkyl group and n is 20 to 100. The polymer can be used to provide a semiconductor. A method for making the polymer comprises reacting 3-alkyl-2,5-dihalogenated thiophene with magnesium in an inert solvent in the substantial absence of water, in the presence of a nickel compound as a catalyst in an inert atmosphere.

18 Claims, 2 Drawing Figures

Wave (cm⁻¹)

Chemical Shift (δ)

LINEAR POLY(3-ALKYL-2,5-THIENYLENE) POLYMER

This application is a continuation of application Ser. No. 06/432,374, filed Sept. 30th, 1982, now abandoned.

BACKGROUND OF THE INVENTION

This invention relates to a novel linear poly(3-alkyl-2,5-thienylene) polymer, a method of producing the same and a semiconductor comprising the same.

Heretofore, poly(2,5-thienylene) consisting essentially of the repeating unit having the formula:

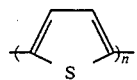

has been known. However, a polymer having a substituent in the thiophene ring has not been known. The known poly(2,5-thienylene) has a property which enables it to become a semiconductor by addition of an electron acceptor such as iodine or $SO_3$. However, the semiconductor thus obtained has drawbacks in that it is difficult to form and difficult to dissolve in a solvent.

SUMMARY OF THE INVENTION

An object of this invention is to obviate the above-mentioned drawbacks of known poly(2,5-thienylene).

The inventors have made various experiments and studies for solving the above-mentioned drawbacks of poly(2,5-thienylene) polymer leading to this invention by finding out that, if a substitutent lower alkyl group is combined in the thiophene ring, affinity between its polymer and its solvent is unexpectedly increased and the polymer is dissolved easily in its solvent and the property of the polymer as an electron donating ability is enhanced due to the presence of the combined substituent lower alkyl group and the polymer combines more strongly with an electron acceptor.

A feature of the invention, therefore, is to provide a linear poly(3-alkyl-2,5-thienylene) polymer consisting essentially of the repeating unit having the formula:

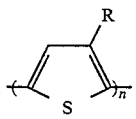

(I)

wherein R represents a lower alkyl group such as methyl, ethyl, propyl or butyl group, and n=20-100.

Another feature of the invention is to provide a method of producing the linear poly(3-alkyl-2,5-thienylene) polymer by reacting 3-alkyl-2,5-dihalogenated thiophene with magnesium using a nickel compound as a catalyst in an inert solvent in the substantial absence of water.

A further feature of the invention is to provide a semiconductor comprising the linear poly(3-alkyl-2,5-thienylene) polymer.

Further objects and features of the invention will be fully understood from the following detailed description with reference to the accompanying drawings, wherein:

DETAILED EXPLANATION OF THE INVENTION

Figure 1:
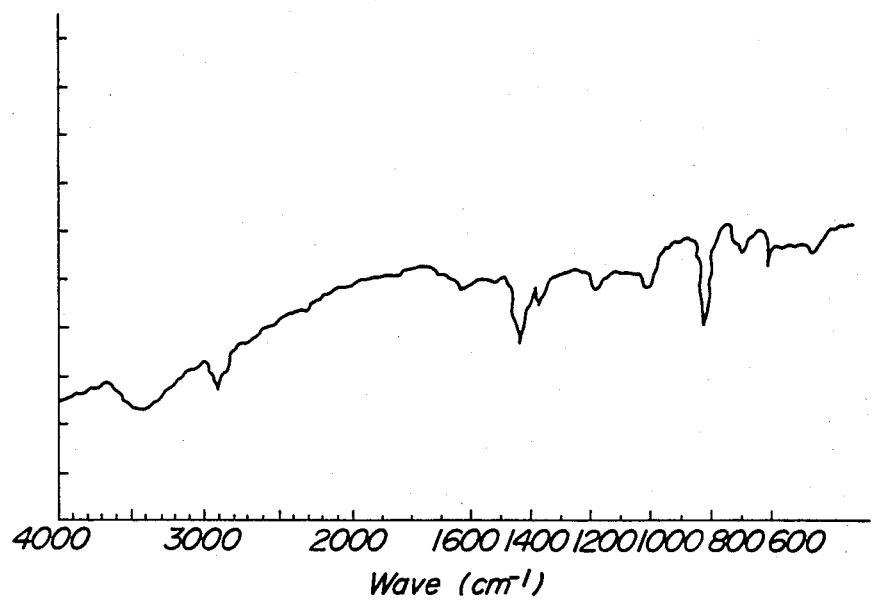
FIG. 1 is a characteristic graph of infrared ray absorption spectrum of poly(3-methyl-2,5-thienylene) according to the invention.

The reaction in the method of the invention is expressed by the following equation formula.

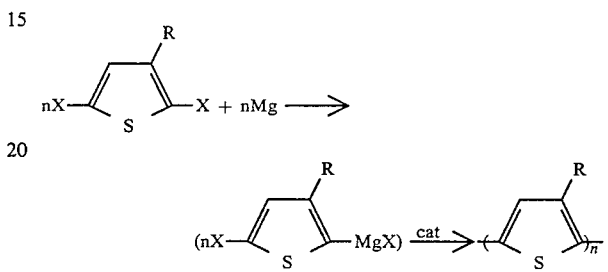

wherein R represents a lower alkyl and X represents a halogen atom. In the above polymerization reaction by dehalogenation using magnesium, the inventors have found out that a usage of a nickel compound as a catalyst is necessary. Though the polymerization reaction proceeds to some extent when the catalyst is not used or when a compound of a transition element other than nickel is used as a catalyst, the reaction speed of the polymerization is low and yield is considerably low.

The catalyst nickel compound is added to the reaction system before or after the reaction of 3-alkyl-2,5-dihalothiophene with magnesium. These reactants are reacted and subsequently polymerized by the catalytic action of the catalyst nickel compound.

As the catalyst nickel compound, preferably halogenated nickel such as $NiCl_2$, $NiBr_2$ etc., a complex nickel compound such as dichloro(2,2'-bipyridine)nickel (abbreviated as "NiCl$_2$(bpy)"), dibromobis(triphenylphosphine)nickel (abbreviated as "NiBr$_2$(pph$_3$)$_2$"), 1,5-cyclooctadiene-bis(triphenylphosphine) (abbreviated as "Ni(cod)(pph$_3$)$_2$") or the like is used.

An appropriate amount of the catalyst to be used is 0.01–0.5 wt. % relative to 3-alkyl-2,5-dihalothiophene.

As the inert solvent, use is made of a solvent such as ether series solvent, which dissolves 3-alkyl-2,5-dihalothiophene. As the ether series solvent, tetrahydrofuran, diethylether and dibutylether etc. are mentioned.

The reaction is conducted in the substantial absence of water. The organic magnesium compound produced by the reaction of 3-alkyl-2,5-dihalothiophene with magnesium is decomposed by the water and hence the polymerization reaction is terminated. The polymerization is preferably effected under reflux condition.

The polymerization is preferably performed in an inert atmosphere. This is because the organic magnesium compound reacts with moisture, carbon dioxide and oxygen in the air and hence the polymerization reaction is prevented from proceeding.

The polymerization reaction can be effected over a wide range of temperature. Usually, a temperature of from ambient to solvent-reflux temperature is used. Though the reaction proceeds even at a temperature of 0° C., some induction period is necessary in such a circumstance.

Appropriate amount of magnesium to be added is 0.98–1.10 gram atom relative to 1 mol of 3-alkyl-2,5-dihalothiophene.

The polymer of the formula I according to the invention dissolves easily in its solvent. This is just contrary to the difficult-dissolving property of (2,5-thienylene)-polymer. The longer the chain length of the lower alkyl group of the polymer according to the invention is, the greater the solubility in the solvent is. The polymer according to the invention has an enchanced electron-donating property because the alkyl group of electron-donating property has been combined thereto, and can form a stronger bond between an electron acceptor such as iodine etc. Thus, the polymer according to the invention is a valuable polymer which is converted into an exceedingly superior semiconductor by addition of an electron acceptor.

As the electron acceptor, use is made of an inorganic electron acceptor such as iodine, sulfuric acid etc. or an organic electron acceptor such as tetracyanoqinodimethane, tetracyanoethylene etc. Among these electron acceptors, iodine additive can generally be used also as an anodizing agent in an electric cell as described in the Japanese patent application laid-open No. 15,369/82.

Hitherto, as an organic semiconductor material, polyacetylene etc. have been known. However, polyacetylene has a disadvantage that it is liable to suffer an adverse influence of oxygen in the air. In contrast, the polymer of the formula I according to the present invention is eminently superior, in that it is inactive to the air.

Hereinafter, the present invention will be explained in more detail with reference to examples which, however, should not be understood by any means as limitations of the present invention.

EXAMPLE 1

A 200 ml four neck flask is charged with 9.61 g (37.5 mmol) of 3-methyl-2,5-dibromothiophene. The content is then added with 15 ml of dry tetrahydrofuran and 0.91 g (37.5 mmol) of metallic magnesium to react under agitation at an ambient temperature under dry nitrogen atmosphere. After about 1 hour it is seen that metallic magnesium is consumed substantially. Thereafter, 45 mg (0.16 mmol) of dichlorobis(2,2'-bipyridine)nickel (abbreviated as "NiCl₂ (bpy)") and 80 ml of dry dibutylether are added and reacted by heating under reflux condition for 3 hours to precipitate poly(3-methyl-2,5-thienylene) of red brown colour. The thus formed polymer is washed with a hydrochloric acid methyl alcohol mixture, washed with water, and dried to obtain 1.52 g of product polymer.

Infrared absorption spectrum of the product polymer has absorptions as shown in FIG. 1 at 2,900 cm$^{-1}$ of C—H stretching oscillation due to CH$_3$ group and further at 1,440 cm$^{-1}$ and 820 cm$^{-1}$ respectively of skeleton oscillation of thiophene and C—H out-of-plane vibration. However, the infrared absorption spectrum scarcely show absorption at approximately 980 cm$^{-1}$ due to stretching oscillation of C—Br bond. This certifies the fact that the product polymer has a sufficiently large polymerization degree and has a structure of the following formula

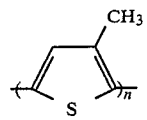

The polymer of the formula (II) has infrared spectrum absorption bands at 850 cm$^{-1}$ which are characteristic to 2,4-disubstituted thiophene. This supports a fact that the following group

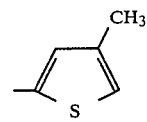

is present in the polymer as a terminal group.

The red brown polymer is further extracted with hot chloroform in a Soxhlet's extractor for 50 hours. As a result, 1.44 g (about 95 wt. %) of powdery red brown polymer extracted with hot chloroform and 0.08 g (about 5 wt. %) of powdery red brown polymer not extracted with hot chloroform are obtained. The polymer which is insoluble in hot chloroform is not softened up to the temperature of 370° C., showing noticeably high heat stability.

Number average molecular weight of the chloroform-soluble polymer is measured by vapour pressure osmometry using Corona 117 type molecular weight-measuring apparatus made by Haarge Co. in West Germany and chloroform to find a value of about 2,300. This molecular weight corresponds to a case wherein a value of polymerization degree (n) is about 24, when considered the structure of the formula (I).

When studied the infrared spectrum of the polymer which is insoluble in chloroform, photo-extinction degree of the absorption bands at 850 cm$^{-1}$ and 730 cm$^{-1}$ presumably resulting from the terminal group

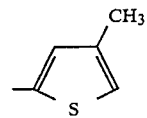

of the polymer is found to decrease to about ¼ of the photo-extinction degree of the same absorption bands in the infrared spectrum of the polymer which is soluble in chloroform. This means a fact that, if both polymers have the same formation mechanism and a similar polymerization terminal group, the chloroform-insoluble polymer has a polymerization degree of 4 times (correspondingly, n is 96 in the formula (I)) than the chloroform soluble polymer. The value of the thus obtained polymerization degree n of the chloroform-insoluble polymer is a reasonable value, judging from low solubilities of the polymer in organic solvents and noticeably high heat stability of the polymer. Because chloroform-insoluble polymer has a low solubility, it is considered that the chloroform-insoluble polymer has a considerably higher polymerization degree than the chloroform-soluble polymer.

Figure 2:
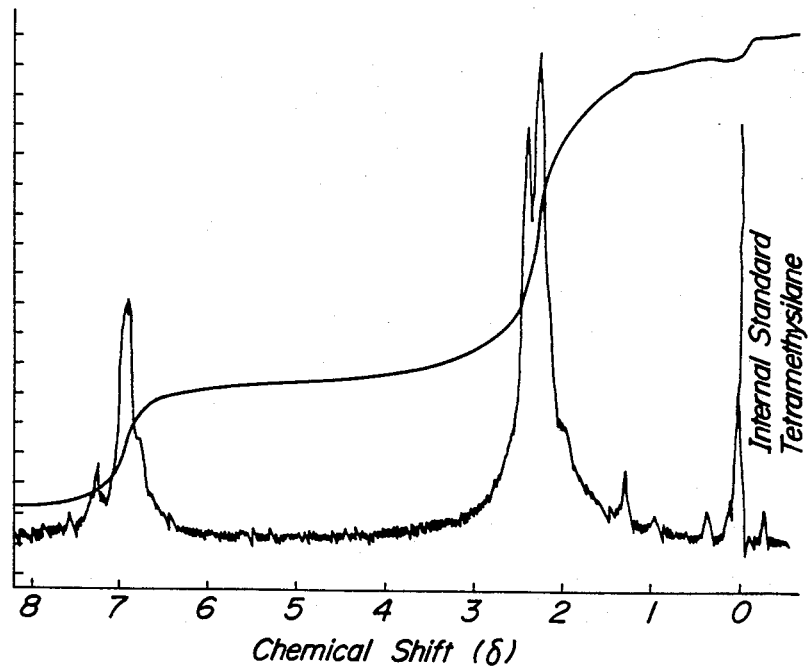
FIG. 2 is a characteristic graph of proton NMR spectrum of the poly(3-methyl-2,5-thienylene) according to the invention.

Proton nuclear magnetic resonance spectrum of the chloroform-soluble polymer in deuterated chloroform CDCl₃ is shown in FIG. 2. At δ1.5–3.0 ppm (values at a magnetic field of lower side than tetramethyl silane of internal standard) absorption due to CH3 group bonded to thiophene is seen. At δ6.5-7.5 ppm absorption due to hydrogen on the thiophene ring is seen. Areal ratio of the two absorptions is about 3:1 which certifies the fact that the polymer of the present invention has the structure as shown in the formula II.

EXAMPLE 2

A 200 ml four neck flask is charged with 10.8 g (44.2 mmol) of 3-methyl-2,5-dibromothiophene, 25 ml of dry tetrahydrofuran, 1.08 g (44.2 mmol) of metallic magnesium and 0.15 mmol of NiCl2 (bpy). The contents are refluxed for 5 hours while agitating under dry nitrogen atmosphere. The thus formed precipitates are collected and washed in the same manner as in Example 1 to obtain 2.36 g of powdery polymer poly(3-methyl-2,5-thienylene) of red brown colour. The polymer is divided by the similar operation as in Example 1 into 1.96 g of chloroform-soluble polymer having a softening point of 160° C. and 0.40 g of chloroform-insoluble polymer which does not soften until 370° C. and has a high heat stability. Number average molecular weight of the chloroform-soluble polymer is measured in the similar manner as in Example 1 to find a value of about 1,300, corresponding to a polymerization value n of about 14. The chloroform-insoluble polymer is considered to have substantially the same polymerization degree as the chloroform-insoluble polymer obtained in Example 1, judging from its infrared spectrum and its noticeably high heat stability.

EXAMPLE 3

The chloroform-soluble polymer obtained in Example 1 is moulded in a mould (manufactured by Shimadzu Seisaku-sho K.K.) which is used for preparing infrared spectrum specimen under a pressure of 500 kg/cm². The thus obtained plate-like substance is tested to determine its electrical conductivity. Electrical conductivity is $9 \times 10^{-14} \Omega^{-1} \cdot cm^{-1}$ at 18° C.

Powder of the polymer is exposed to iodine vapour in a glass vessel at ambient temperature for 11 hours to absorb iodine. The thus treated powder contains 48 wt. % of iodine. The iodine content is calculated from the increase of weight by absorption of iodine. The powder is moulded in the same manner as mentioned above and the resultant plate-like substance is tested to determine its electrical conductivity. Electrical conductivity is $2.8 \times 10^{-2} \Omega^{-1} \cdot cm^{-1}$ at 18° C.

The chloroform-soluble polymer obtained in Example 2 is also exposed to iodine vapour for 40 hours to obtain a powder containing 1.2 g of iodine relative to 1 g of the polymer. The powder is moulded in the same manner as mentioned above and the obtained plate-like substance is tested to determine its electrical conductivity. Electrical conductivity is $1.1 \times 10^{-2} \Omega^{-1} \cdot cm^{-1}$ at 18° C.

The chloroform insoluble polymer obtained in Example 2 is also exposed to iodine vapour for 23 hours to obtain a powder containing 1.4 g of iodine relative to 1 g of the polymer. The powder is moulded in the same manner as mentioned above and the obtained plate-like substance is tested to determine its electrical conductivity. Electrical conductivity is $4.5 \times 10^{-1} \Omega^{-1} \cdot cm^{-1}$ at 18° C.

Although the invention has been described in detail with reference to specific embodiments, it is understood that the present disclosure has been made only by way of example and that numerous changes and modifications may be resorted to without departing from the broad aspect and scope of the invention as hereinafter claimed.

What is claimed is:

1. A linear poly(3-alkyl-2,5-thienylene) polymer consisting essentially of the repeating unit having the formula:

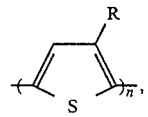

wherein R represents a lower alkyl group, and n is 20-100.

2. A method of producing a linear poly(3-alkyl-2,5-thienylene) polymer consisting essentially of the repeating unit having the formula:

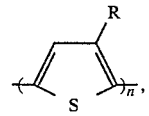

wherein R represents a lower alkyl group and n is 20-100, comprising reacting 3-alkyl-2,5-dihalothiophene with magnesium in an inert solvent in the substantial absence of water, in contact with a nickel compound catalyst in an inert atmosphere.

3. A method as defined in claim 2, wherein the nickel compound is selected from the group consisting of halogenated nickel and nickel complex compound.

4. A method as defined in claim 3, wherein the halogenated nickel is selected from the group consisting of NiCl2 and NiBr2.

5. A method as defined in claim 3, wherein the nickel complex compound is selected from the group consisting of dichloro(2,2'-bipyridine) nickel, dibromobis(triphenylphosphine) nickel and 1,5-cyclooctadiene-bis(triphenylphosphine)nickel.

6. A method as defined in claim 2, wherein the amount of catalyst is 0.01-0.5 wt. % relative to 3-alkyl-2,5-dihalothiophene.

7. A method as defined in claim 2, wherein the inert solvent is an ether series solvent.

8. A method as defined in claim 7, wherein the ether series solvent is selected from the group consisting of tetrahydrofuran, diethylether and dibutylether.

9. A method as defined in claim 2, wherein the reaction is effected under reflux temperature.

10. A semiconductor comprising a linear poly(3-alkyl-2,5-thienylene) polymer and an electron acceptor, the polymer consisting essentially of the repeating unit having the formula:

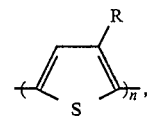

wherein R represents a lower alkyl group, and n is 20 to 100.

11. A method of producing a linear poly(3-alkyl-2,5-thienylene) polymer consisting essentially of the repeating unit having the formula:

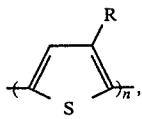

wherein R represents a lower alkyl group and n is 20–100, comprising the steps of reacting 3-alkyl-2,5-dihalothiophene with magnesium in an inert solvent in the substantial absence of water, in contact with a nickel compound catalyst in an inert atmosphere;

washing the thus obtained polymer with a mixture of hydrochloric acid and methyl alcohol;

washing the polymer with water; and drying the thus washed polymer.

12. A method as defined in claim 11, wherein the nickel compound is selected from the group consisting of halogenated nickel and nickel complex compound.

13. A method as defined in claim 12, wherein the halogenated nickel is selected from the group consisting of $NiCl_2$ and $NiBr_2$.

14. A method as defined in claim 12, wherein the nickel complex compound is selected from the group consisting of dichloro(2,2'bipyridine) nickel, dibromobis(triphenylphosphine) nickel and 1,5-cyclooctadienebis(triphenylphosphine) nickel.

15. A method as defined in claim 12, wherein the amount of catalyst is 0.01–0.5 wt. % relative to 3-alkyl-2,5-dihalothiophene.

16. A method as defined in claim 12, wherein the inert solvent is an ether series solvent.

17. A method as defined in claim 16, wherein the ether series solvent is selected from the group consisting of tetrahydrofuran, diethylether and dibutylether.

18. A method as defined in claim 12, wherein the reaction is effected under reflux temperature.

* * * * *